3,047,938
HIGH TEMPERATURE BOND AND METHOD OF FORMING SAME
Robert L. Dega, Utica, Mich., assignor to General Motors Corporation, Detroit, Mich., a corporation of Delaware
No Drawing. Filed Mar. 31, 1958, Ser. No. 724,893
9 Claims. (Cl. 29—182.3)

This invention relates to a method of bonding a sintered briquetted powdered metal composition containing boron nitride to a suitable backing material and to the composite article produced by this method.

Conventionally, rotating shafts are sealed by a circumferentially encasing member having a facing material which contacts the cylindrical surface of the shaft. In some instances a radially extending transverse surface is provided on the rotating shaft for axial contact with an annular sealing member to form the seal. Generally, this latter type of seal is employed under high temperature conditions, for example, where elastomeric O-ring shaft seals are not suitable. Such seals can be constructed to form a continuous rubbing contact against a radial surface of the shaft in which the annular sealing member is axially biased by a spring into contact with the shaft. The annular sealing member can also be rigidly mounted around the shaft to form a close tolerance seal of the abradable type. In this latter type of seal axial movement of the shaft during operation brings a radial surface thereof into contact with the seal. The shaft abrades the seal to form a small operating clearance which forms an effective seal. Each of these types of seals requires a facing material on the contacting surface of the annular sealing member. A low friction material which is not excessively malleable is particularly desirable as a facing material in both of these types of seals.

United States patent application Serial No. 725,426, entitled "High Temperature Seal," in the names of Robert L. Dega, Richard R. Topel and Eric W. Weinman, now abandoned, and United States patent application Serial No. 725,297, entitled "High Temperature Seal," in the names of Richard R. Topel and Eric W. Weinman, both of which are being filed concurrently herewith, relate to a seal facing material which is suitable for use under high temperature conditions. The materials which are disclosed in these applications generally are of a briquetted sintered powdered metal composition containing small amounts of boron nitride. These materials can be used as a facing material in rubbing or abradable type seals. Although such materials are extremely useful, extensive use thereof has been limited heretofore due to an inadequacy in the methods of bonding the materials to a supporting member. It has now been found that it is the presence of boron nitride in the facing material which inhibits satisfactory bonding by conventional methods.

It is therefrore an object of this invention to provide a method of bonding a briquetted powdered metal composition containing boron nitride to a suitable backing material. A further object of this invention is to provide a method of making a composite article having a sintered briquetted powdered metal composition containing boron nitride bonded to a suitable backing material. A still further object of this invention is to provide a multilayer article in which a base metal has a first layer thereon of a boron nitride-free sintered briquetted powdered metal composition and a second layer of a sintered briquetted powdered metal composition containing boron nitride.

In accordance with the invention, a briquette of a powdered metal seal material containing boron nitride is formed to have a boron nitride-free surface. The briquette is placed on a suitable backing metal with the boron nitride-free layer adjacent the surface of the backing metal. The briquette is clamped to the backing metal and then sintered. During the sintering operation the briquetted seal material and the backing metal are firmly joined through a mutual alloy bonding with the boron nitride-free layer.

Other objects, features and advantages of the present invention will become apparent from the following description of preferred embodiments thereof.

A small amount of a boron nitride-free powdered metal base material is introduced into a briquetting die having the desired structure. The base material is then given a light pressure to form a thin layer in the bottom of the briquetting die. Additoinal base material which is mixed with about 2% to 6% boron nitride by weight of the base material is thereafter introduced into the die in sufficient quantities to make up the desired seal material thickness. Both materials are subsequently compressed under a suitable pressure to form a briquette having a thin surface layer which is substantially free of boron nitride. The briquette is removed from the die and the boron nitride-free surface is placed in contact with a metal backing strip. With the briquette clamped lightly to the backing metal to insure adequate contact of the surfaces to be joined, the assembly is sintered at a suitable temperature during which bonding of the material to the backing member occurs.

The boron nitride-free powdered metal base mixture which forms the surface layer on the briquette need not be of a composition which is similar to the body of the briquette. In most instances, however, it is preferred that the two mixtures be similar in metallic composition. The relative thickness of the boron nitride-free surface layer is not particularly critical but must have sufficient extension to inhibit migration of boron nitride to the bonding interface during the briquetting and subsequent sintering operation. The boron nitride is necessary for lubricating the operating surface of the seal material during use. It is therefore preferred that a layer of boron nitride-free material be very thin in proportion to the boron nitride layer to provide maximum utility of the seal material. It has been found that a boron nitride-free layer of approximately 0.030 inch after briquetting is generally satisfactory to insure adequate bonding.

The initial compacting of the surface layer is not particularly essential to the practice of the invention and the pressures used can vary considerably. The initial compacting is employed to form a uniform boron nitride-free layer which inhibits migration of boron nitride to the surface of the briquette during the subsequent briquetting and sintering operations. An initial compacting pressure of four or five tons per square inch is generally enough to serve this purpose, although higher pressures can also be used. Although the main body of the seal material can be introduced into the briquetting die first and initially compacted as above, it is preferred to form the thin layer of boron nitride-free material first.

As disclosed in the above-mentioned co-pending applications, increased density of the material increases its strength and reduces malleability. Accordingly, it is generally desirable to employ a briquetting pressure above 30 tons per square inch and briquetting pressures of approximately 30 tons per square inch to 60 tons per square inch. For most applications a briquetting pressure of approximately 50 tons per square inch is preferred.

The seal materials which are bonded in this invention are particularly adaptable for use as facing materials in seal assemblies subjected to elevated temperatures. It is therefore contemplated that this invention is especially useful in bonding seal materials containing boron nitride to a high temperature corrosion-resistant backing metal. High temperature corrosion-resistant backing or supporting metals which can be used are nickel base alloys and ferrous alloys, such as stainless steel.

To insure effective bonding, of course, it is desirable to employ a clean, oxide-free surface on the backing material. The method of cleaning is not particularly critical and, in general, any of the conventional methods for cleaning a specific backing material are satisfactory. The surface of a ferrous metal alloy, for example, is prepared for bonding preferably first by degreasing in any suitable manner as by means of an alkali cleaner or by use of suitable solvents. After degreasing, if severely rusted or scaled, the ferrous metal is preferably pickled in a water solution of hydrochloric acid in the known and accepted manner of such acid cleaning. After pickling, the ferrous metal may be immersed in a flux, such as one composed of 32 parts of zinc chloride, 8 parts of ammonium chloride and 60 parts of water, all measurements by weight. The foregoing flux is given as a typical example of a zinc chloride-type flux which may be used.

The briquette of seal material is placed on the prepared surface of the backing metal with the boron nitride-free layer contacting the metal surface to form a bonding interface. The briquette is lightly clamped to the backing material to insure adequate contact in the bonding interface and to inhibit any warping which may occur during the subsequent sintering-bonding operation.

As disclosed in the above-mentioned co-pending applications, the sintering temperature can vary considerably from about 300° F. to about 50° F. below the melting point of the metal which is the major constituent in the seal material composition. The temperature at which the briquette material is sintered and the duration of the sintering not only affects the maximum useful temperature of the seal material but the strength of the bond between the material and the backing metal. Maximum corrosion resistance of the seal material at elevated temperatures is obtained through maximum alloying of the powdered metals in the composition. Correspondingly, maximum alloying of the seal material with the backing or supporting metal is desirable to obtain the strongest bonding. It is, therefore, desirable to sinter the mixture for a sufficient time to provide maximum diffusion alloying of the powdered metals in the composition. It has been found that satisfactory bonding of the seal material is obtained when the material has been sintered at a temperature above 1000° F. for one hour or more. More particularly, base material compositions containing a large proportion of copper with small amounts of tin are bonded to stainless steels preferably by sintering for at least one hour at temperatures of 1500° F. to 1600° F. Copper base seal material compositions containing small amounts of nickel are bonded to stainless steels preferably by sintering for at least three hours at temperatures of about 1800° F. to 1900° F.

To obtain maximum advantage of this invention in bonding powdered metal compositions to a backing metal, it is desirable that the metals concerned be metallurgically compatible. Such metals are mutually soluble and, when in contact at elevated temperatures, will mutually diffuse to form an alloy bond. Copper is metallurgically compatible with tin, nickel and ferrous metals. Particularly satisfactory results are thus obtained with this invention when bonding copper base seal materials to tin, nickel or ferrous metal backing members.

To inhibit corrosion or oxidation of the seal material and backing metal at the elevated sintering temperatures, it is advantageous to conduct the sintering operation in a non-oxidizing atmosphere. Heating in an atmosphere of cracked ammonia (one part by volume nitrogen and three parts by volume hydrogen) is generally satisfactory for this purpose. Other non-oxidizing atmospheres which can also be employed are nitrogen, carbon monoxide, helium and argon. It has been found that powdered metals which will substantially pass about a 100 mesh screen and be substantially retained on about a 325 mesh screen can be used satisfactorily in seal materials contemplated by this invention. If during the sintering operation one of the metals in the base material is melted, the particle size thereof can vary considerably up to about a 100 mesh size. Thus, for example, for copper base seal materials containing small amounts of tin which are sintered at temperatures over 550° F., the precise particle size of the tin is not critical and can vary substantially up to about 100 mesh size.

It is understood that although this invention has been described in connection with certain specific examples thereof, no limitation is intended thereby except as defined in the appended claims.

I claim:

1. A method of bonding a high temperature seal material which comprises making a briquette of powdered metal and boron nitride in such a manner as to form a boron nitride-free surface thereon, placing said briquette on a support of a metal which is metallurgically compatible with said powdered metal, said boron nitride-free surface being directly contiguous a surface of said support, and sintering said briquette while in said contact with said support to form an alloy bond therebetween.

2. A method of bonding a high temperature seal material which comprises compressing a powdered metal base material containing boron nitride and a boron nitride-free powdered metal base material to provide a briquette having a boron nitride-free surface, placing said briquette on a support of a metal which is metallurgically compatible with said powdered metal, said boron nitride-free surface being directly contiguous a surface of said support, and sintering said briquette while in said contact with said support to form an alloy bond therebetween.

3. A method of bonding a high temperature seal material which comprises compressing a powdered metal base material containing boron nitride onto a thin layer of a boron nitride-free powdered metal base material so as to provide a briquette having a boron nitride-free surface, placing said briquette on a support of a metal which is metallurgically compatible with said powdered metal, said boron nitride-free surface being directly contiguous a surface of said support, holding said briquette in said contact with said support, and sintering said briquette while in said contact with said support to form an alloy bond therebetween.

4. A method of forming a composite article which comprises compressing a layer of a powdered metal base material containing boron nitride into a layer of a boron nitride-free powdered metal base material in such a manner so as to provide a briquette having a boron nitride-free surface, placing said briquette on a support of a high temperature corrosion-resistant metal which is metallurgically compatible with said powdered metal, said boron nitride-free surface being directly contiguous a surface of said support, lightly holding said briquette in said contact with said surface, and sintering said briquette in a non-oxidizing atmosphere while said briquette is in said contact with said support.

5. A method of forming a composite article which comprises lightly compressing a layer of a boron nitride-free powdered metal base material and a layer of a powdered base material containing boron nitride under a pressure of approximately 30 tons per square inch to 60 tons per square inch to form a briquette having a boron nitride-free surface, placing said briquette on a support of a metal which is metallurgically compatible with said powdered metal, said boron nitride-free surface being directly contiguous a surface of said support, and sintering said briquette while it is in said substantial contact with said support.

6. A method of forming a composite article which comprises lightly compressing a boron nitride-free powdered metal base material in a briquetting die, adding a powdered metal base material containing boron nitride to said briquetting die, compressing said materials under a pressure of approximately 30 tons per square inch to 60 tons per square inch to form a briquette having a boron nitride-free surface, placing said briquette on a support of a metal which is metallurgically compatible with said powdered metal, said boron nitride-free surface being directly contiguous a surface of said support, and sintering said briquette for at least one hour at a temperature of a least about 1000° F. while said briquette is in said substantial contact with said support.

7. A method of forming a composite article which comprises lightly compressing a thin layer of a powdered base material containing a major proportion of copper in a briquetting die, introducing additional powdered base material which is mixed with approximately 2% to 6% boron nitride by weight of the base material into said briquetting die, compressing said materials under a pressure of approximately 50 tons per square inch to form a briquette having a boron nitride-free surface, placing said briquette on a support of a high temperature corrosion-resistant metal which is metallurgically compatible with said powdered metal, said boron nitride-free surface being directly contiguous a surface of said support, lightly clamping said briquette into said contact with said support, and sintering said briquette for at least about one hour at a temperature of at least about 1000° F. while said briquette is in said substantial contact with said support.

8. A multilayer high temperature composite sealing member comprising a solid metal base member, a first layer contiguous said base member of a boron nitride-free briquetted sintered powdered metal base material, said layer being at least about 0.030 inch in thickness and a second layer over said first layer of a briquetted sintered powdered metal base material containing about 2% to 6% boron nitride by weight of the powdered metal.

9. A multilayer high temperature sealing member comprising a solid metal base member, a first layer contiguous said base member of a boron nitride-free briquetted sintered powdered metal base material containing a major proportion of copper, said layer being at least about 0.030 inch in thickness and a briquetted sintered second layer over said first layer of a mixture of said base material with about 2% to 6% boron nitride by weight of the powdered metal.

References Cited in the file of this patent
UNITED STATES PATENTS

| | | |
|---|---|---|
| 1,910,884 | Comstock | May 23, 1933 |
| 2,431,660 | Gaudenzi | Nov. 25, 1947 |
| 2,854,736 | Taylor | Oct. 7, 1958 |
| 2,906,007 | Bibbins | Sept. 29, 1959 |